United States Patent [19]
Spreitzhofer

[11] 3,742,202
[45] June 26, 1973

[54] PEAK INTEGRATOR
[75] Inventor: Ernst Spreitzhofer, Nussdorf, Germany
[73] Assignee: Bodenseewerk Perkin-Elmer & Co., GmbH, Uberlingen/Bodensee, Germany
[22] Filed: Nov. 18, 1971
[21] Appl. No.: 199,901

[30] Foreign Application Priority Data
Nov. 20, 1970 Germany.................. P 20 56 998.6

[52] U.S. Cl............. 235/183, 235/151.35, 328/115, 328/147
[51] Int. Cl. ....................... G06g 7/18, H03k 5/20
[58] Field of Search....................... 235/183, 151.35; 328/115, 116, 127; 307/228, 231, 149, 235, 238, 247

[56] References Cited
UNITED STATES PATENTS
3,412,241 11/1968 Spence et al. ...................... 235/183
3,538,317 11/1970 Fukuda............................... 235/183
3,659,209 4/1972 Puckette............................. 307/231

FOREIGN PATENTS OR APPLICATIONS
1,548,794 9/1969 Germany............................ 328/127

OTHER PUBLICATIONS
Picciano et al.: IBM Technical Disclosure Bulletin, p. 105 and 106, Electronic Integration System, Vol. 4, No. 12, May 1962.

Primary Examiner—Felix D. Gruber
Attorney—Edward R. Hyde, Jr.

[57] ABSTRACT
An integrator apparatus for measuring the area under peaks in an input signal includes a main integrator for measuring such peaks, and a slope detector for comparing the signal change during each of a regular sequence of short measuring time intervals (the beginning and end of each of which is controlled by a repetitive timing pulse generator or programmer) and resetting the integrator to zero if the input signal does not change by more than a significant (threshold) amount during such a measuring interval. Thus the integrator continues to accumulate the input signal during each peak, including that part found in the first measuring time interval in which the beginning of the peak is detected, but the integrator is reset to zero after all measuring time intervals in which no signal peak exists, including those in which a peak has ended and those in which only noise is present.

3 Claims, 2 Drawing Figures

PATENTED JUN 26 1973   3,742,202
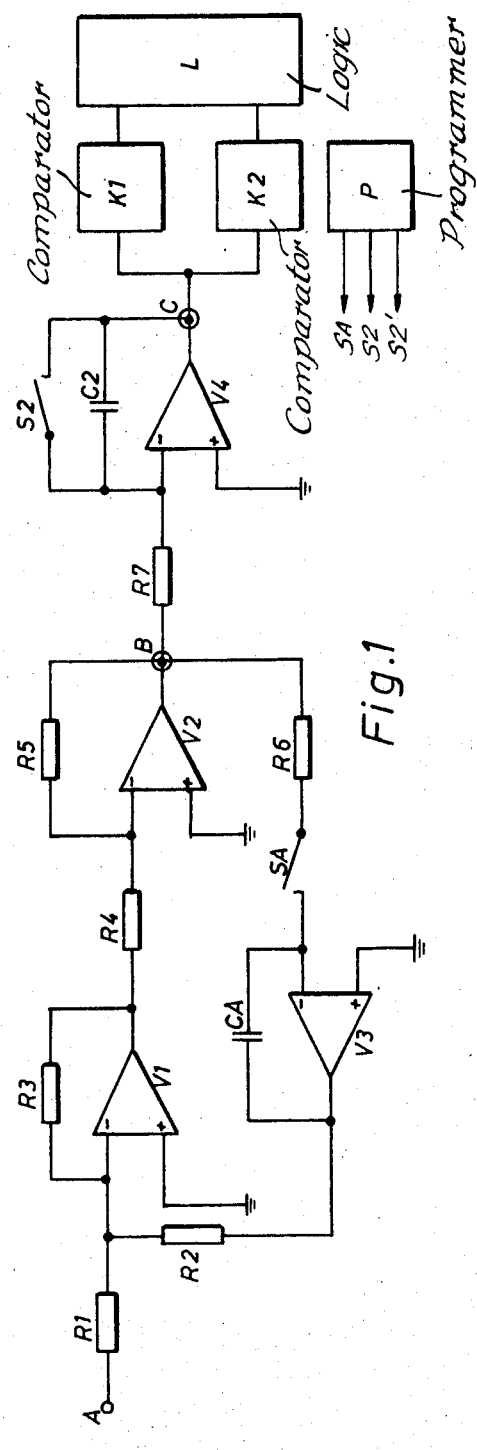
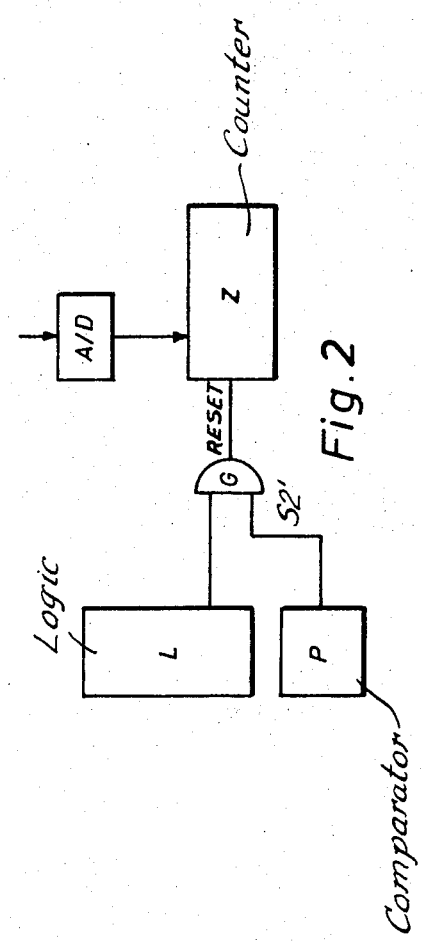
INVENTOR
*Ernst Spreitzhofer*
BY
*Daniel W. Levinson*
ATTORNEY.

PEAK INTEGRATOR

This invention relates to a peak integrator comprising a slope detector initiating the integration of peaks in an input signal desired to be measured, said slope detector periodically comparing the signal rise during a given measuring time interval (determined by a programmer) with a respective threshold value, and the integrator being controlled by the result of this comparison.

A peak integrator of the type indicated has been proposed in German printed patent application 1,903,698, corresponding to my U.S. Pat. application Ser. No. 5,178 filed Jan. 23, 1970, now U.S. Pat. No. 3,634,770, in which the measured signal controls trigger stages through a summing amplifier and an integration stage, the outputs of said trigger stages applying pulse sequences to a (binary) counter. The counter reading is converted by a digital-to-analog converter to an analog signal which compensates the input signal at the summing amplifier. This application of the pulse sequences is effected periodically during (equally spaced in time) relatively short nulling time intervals. Each nulling time interval is followed by a measuring time interval, and the signal rise is observed during this (fixed in length of time) measuring time interval. To accomplish this, a second pair of trigger stages, connected to the output of the integration stage, change condition whenever (positive and negative, respectively) preset threshold values of the measuring signal integral are exceeded. Since the measuring time intervals are of the same length, this integral is proportional to the change in amplitude (i.e., rise) of the measured input signal. These second trigger stages control an analyzer logic circuit which supplies a signal starting when the rise of the measured signal exceeds a preset threshold value, and ending when, after passage of the (peak) signal through a maximum (reversal of sign of the rise), the signal "rise" (in this case a negative change) again falls below a fixed, (negative) threshold value. In such an arrangement, all changes in the measured signal (including those which do not exceed the threshold value during the measuring time interval) are compensated during the next following nulling time interval, so that prior to the occurrence of a peak the zero level or base line of the signal is established at the integration stage. Then, it is determined how the signal changes from this base line level during the course of the next measuring time interval. The integration stage provides for a suppression of the influence of temporary stray fluctuations or "peaks" in the measured signal (e.g., caused by "noise"), thereby preventing erroneous actuation of the trigger stages.

In such a peak integrator, if the integration of the peak of the measured signal is initiated at that instant in which the comparison provides a signal rise exceeding the threshold value, then the measured signal will not be integrated during this measuring time interval. This leads to an error in the integration since, as shown by the comparison, the peak rise had already started in this measuring time interval.

It is an object of this invention to provide a peak integrator of the type indicated in which the described error of the integration is avoided and in which an allowance in the integration is made for the first measuring time interval in which a signal rise exceeding the threshold value is encountered for the first time.

According to the invention this object is accomplished by providing that the actual measuring integrator constantly supplied with the measured input signal can be reset to zero by a restoring signal from the programmer at the beginning of each measuring time interval, but the restoring signal is blocked when the threshold value is exceeded.

Thus, during each individual measuring time interval an integration of the measured signal is accomplished. The result of this integration will be cancelled if the measuring signal rise does not reach the threshold value during this measuring time interval. If, however, the threshold value is reached, then the restoring signal will be blocked and the final integrator continues integrating as long as the peak occurs. In this manner, the integral will include the measured signal rise during the first measuring time interval.

The invention may be embodied in apparatus such that the slope detector includes a summing amplifier and an inverting amplifier, that the ouput signal of the inverting amplifier is applied, on the one hand, through a first switch to a first integration stage whose output together with the measuring signal is applied to the input of the summing amplifier, and on the other hand to a second integration stage which can be reset to zero by a second switch and whose output is supplied to comparators for a comparison of this output with the threshold value, and that a programmer supplies timing pulses such that the first switch is closed periodically during nulling time intervals and the second switch is closed at the beginning of the measuring time intervals, intermediate to the nulling time intervals.

The inverting amplifier effects a sign reversal of the summing amplifier output so that the inverting amplifier generates a signal suitable for balancing out or compensating of the summing amplifier output signal. This inverted signal is applied to the input of the summing amplifier during each nulling time interval through an integration stage and always returns this input to zero. During the measuring time the first switch remains open so that the output signal of the summing amplifier increases in response to the change in the measuring signal (relative to the just set compensated level). Accordingly the inverted signal rises at the output of the inverting amplifier. This signal is integrated by the second integrator which has been reset to zero at the beginning of the measuring time interval. The output signal of the second integrator is proportional to the signal rise, due to the fixed length of the measuring time interval. This signal is compared with preset threshold values by comparators.

Optionally, the main or input signal integrator may include a counter into which pulses are supplied at a frequency proportional to the measured input signal, that the programmer applies a restoring (resetting to zero) pulse to the counter through an AND-element at the beginning of each measuring time interval, and that the comparators control an analyzer logic circuit which blocks the AND-element when the threshold value is exceeded (by controlling a second input of the AND-element).

An illustrative embodiment of this invention will now more fully be described with reference to the accompanying drawings, in which:

FIG. 1 is a schematic diagram of a slope detector in a peak integrator incorporating the invention; and FIG. 2 is a schematic block diagram of the control of a final signal integrator in dependence on the slope detector according to FIG. 1.

An input signal, the peaks in which are to be measured, is applied to an input terminal A and therefore to a summing amplifier V1 through a resistor R1. The summing amplifier V1 has applied thereto a second signal through a resistor R2 in a manner to be described hereinafter. Reference numeral R3 designates the negative feedback resistor of the summing amplifier V1. The output of the summing amplifier V1 is applied to an inverting amplifier V2 including the input and feedback resistors R4 and R5. Thus, at the output B of the inverting amplifier a signal is produced whose polarity is the same as the polarity of the signal at the input to the summing amplifier. This signal at the output B is applied through a resistor R6 and switch SA to an integration stage comprised of an amplifier V3 including a capacitor CA in the negative feedback, constituting with the resistor R6 a Miller integrator. The ouput of this first integration stage is applied to the input of the summing amplifier V1 through the resistor R2. Thus, a signal is obtained at point B whose polarity is of the same sign as the polarity of the measuring signal in point A. When switch SA is closed, this signal is integrated by the first integrator and connected in opposition to the measuring signal until nulling thereof is effected, thereby causing the signal at point B to disappear (i.e., be balanced to zero). A programmer P supplies timing pulses to switch SA to cause it to be periodically closed during a series of short, regularly reoccurring "nulling time intervals". Between the nulling time intervals the switch SA is open, and the time intervals between the nulling time intervals are hereinafter called "measuring time intervals".

The signal at point B is also applied through a resistor R7 to a second integration stage including the amplifier V4 and a capacitor C2 in its negative feedback branch. The amplifier V4 together with the resistor R7 and the capacitor C2 also constitutes a Miller integrator. In parallel or shunting relationship to capacitor C2 is a switch S2. The switch S2 is momentarily closed by the programmer P at the beginning of each measuring time interval, so that at this instant the second integration stage is reset to zero. Switches SA and S2 may be electronic switches, but are shown as mechanical switches solely for the purpose of ease of illustration. The integrated signal at point C is applied to two comparators K1 and K2, which compare the signal at point C with an upper positive and a lower negative threshold value. The comparators K1 and K2 control an analyzer logic circuit L.

The analyzer logic circuit may for instance be designed as illustrated in FIG. 3 of printed German patent application 1,903,698, corresponding to my U.S. Pat. application, Ser. No. 5,178 filed Jan. 23, 1970, now U.S. Pat. No. 3,634,770. The particular logic circuit in FIG. 3 of this patent will provide a direct indication at output 100 of whether a true peak exists in the input signal or not. In particular, the output 100 will be "1" (or high) whenever there is no peak and "0" (or low) whenever a peak exists (including both its rising to a maximum, passing through the maximum, and its decreasing on the other side of the peak). Thus a "0" signal will appear at 100 whenever there is no peak in the input, and this lack of signal may be used directly to block, for example, an AND gate (G) as explained immediately hereinafter.

The input signal to be measured is also applied to an analog to pulse train converter A/D which generates a pulse sequence proportional to the measuring signal (see FIG. 2). This pulse sequence is counted into a counter Z. At the beginning of each measuring time interval a short resetting (to zero) or restoring pulse is normally applied by the programmer (or supplier of clock pulses) P to the counter Z and the counter reading cancelled (i.e., zeroed). However, this restoring pulse is supplied through an AND-element G. The AND-element G is controlled (at its other input) by the output of th analyzer logic circuit L in such a manner that the restoring pulse is blocked when the peak or slope detector (right hand side of FIG. 1) indicates a signal change exceeding the threshold value. Where the analyzer logic circuit L supplies a "0" whenever there is no peak and a "1" whenever a peak occurs (as in the above referenced circuit in Applicant's copending patent), this signal may be directly applied at one of the two inputs to AND gate G, so as to cause "blocking" of the gate G (by supplying a low or "0" input) whenever there is no peak, and "enabling" of the gate G (by supplying a high or "1" input) whenever there is a peak in the input signal.

The arrangement hereinbefore described operates as follows. By operation of the first integration stage (V3, C1, R6), during each of the nulling time intervals during which the switch SA is closed, the measured signal at the input A is compensated (or balanced to zero). At the beginning of each measuring time interval the signal is therefore zero at point B. At the beginning of each measuring time interval the switch S2 is closed momentarily, and the second integration stage V4, R7, C2 is thus reset to zero. During the rest (i.e., substantially all) of the measuring time interval the switches SA and S2 are then open. Upon a deviation of the measured signal from the nulled value (for example, a signal rise), a signal occurs at point B corresponding to this rise. This signal is integrated by the second integration stage. This integration serves the purpose of suppressing the influence of temporary signal peaks due to disturbing voltages (e.g., "noise"). At the end of the measuring time interval a signal occurs at point C which is proportional to the signal rise. Assuming a linear signal rise, then the integral at C will be equal to the area of a triangle having the constant base line of length $t_M$ (measuring time interval) and a height which is equal to the signal rise during the measuring time.

The signal at point C controls two comparators K1 and K2 which compare the signal with preset (positive and negative but typically of equal absolute value) threshold values. These may be trigger stages which change from one state to another state or condition when the threshold value is reached. The comparators K1 and K2 control an anlyzer logic circuit L which blocks the AND-element or gate G when the threshold value is exceeded.

The measuring signal is converted by the analog to pulse train converter to a series of pulses of a pulse frequency proportional to the amplitude of the measuring signal, which pulses are constantly counted by the counter Z. At the beginning of each measuring time interval, the counter Z is normally reset to zero by the programmer P by means of a short resetting or restoring pulse S2' (similar to that supplied to switch S2). If, however, during such a measuring time interval, the threshold value at either of the comparators K1 or K2 is exceeded, then the analyzer logic L blocks this resetting or restoring pulse through the gate G. The pulses counted into the counter during this measuring time interval, which correspond to the integral of the measured signal through this measuring time interval, therefore remain counted in the counter, and the counter continues counting to produce a count indicative of the area under the peak. Thus, this integral already contains the count during the first measuring time interval in which a peak rise was determined. A systematic error, such as may occur in prior circuits of this type, is thereby avoided. This is of particular significance in measuring sharply rising peaks in which such an error could lead to a non-negligible falsification of the integration result. The counter Z (along with the analog to pulse train converter) acts as a resettable integrator, the counter Z alone being a resettable accumulator.

By changing the measuring time $t_M$, the sensitivity of the slope (peak) detector can be adjusted. The measuring time is by definition, the time between each nulling interval (which in turn is the time that switch SA is closed by the programmer or clock P.) This measuring time can therefore be varied by changing the length and/or repetition rate of the nulling intervals (e.g., employing a different setting of a variable clock).

It is necessary to achieve fully the advantage afforded by the invention that a slope detector be used which preferably determines the signal rise during a specific measuring time interval as by integration, since inclusion of the peak area in this first measuring time interval is thereby rendered possible. When using a slope detector operating by means of differentiation of the measured signal at least some portion of the peak area is not integrated, namely, that which occurs prior to the attainment of the threshold value of the signal rise rate.

What is claimed is:

1. An integrating apparatus for measuring the total area of peaks in an input signal, including a main signal integrator and a slope detector for initiating integration of actual peaks in the input signal when the input signal change is determined to be significant by exceeding a predetermined threshold value, said slope detector comprising: means for measuring, during each of a regularly occurring sequence of short, equal length measuring time intervals, the change in said input signal relative to its value at the beginning of each said measuring time interval; means for comparing said input signal change to said threshold value; and means for supplying a control signal whenever said input signal change exceeds said threshold value;

said main integrator comprising means for effectively integrating said input signal and storing the accumulated integrated value thereof in a resettable accumulator;

programming means supplying a set of resetting pulses at the beginning of each said measuring time interval;

and gating means having its output connected to said resettable accumulator of said main integrator and supplied with both said resetting pulses and said control signal at its input, and being of such construction as to pass said resetting pulses to reset said accumulator except when inhibited by the presence of said control signal, whereby said accumulator is reset to zero at the beginning of each measuring time interval except when the slope detector has determined that a peak exists in the immediately previous measuring time interval, so that the very beginning of each peak as well as all subsequent parts, is measured by said main integrator.

2. An integrating apparatus according to claim 1, in which:

said slope detector comprises: a summing amplifier (V1) to the input of which is supplied said input signal desired to be measured; an inverting amplifier (V2), the output of which is connected through a first switch (SA) to a first integrator stage (V3, C1, R6) having its output connected to the input of said summing amplifier in opposite polarity to said input signal; the output of said inverting amplifier also being connected directly to the input of a second integration stage (V4, C2, R7) which is resettable to zero by means of a second switch (S2); threshold comparators (K1, K2) connected to the output of said second integration stage for comparing the integrated output value with a positive and negative threshold value; and a logic circuit (L) for generating said control signal in response to said threshold comparators;

said programming means supplies a set of nulling pulses for closing said first switch during nulling time intervals between each of said measuring time intervals; and a set of pulses for momentarily closing said second switch at the beginning of each of said measuring time intervals, whereby said first integration stage causes balancing of the input and therefore the output of said summing amplifier to zero during each nulling time interval, and said second integration stage is reset to zero at the beginning of each measuring time interval so that its output yields during each measuring time interval a measurement of the net change in the input signal from its value at the beginning of that measuring time interval.

3. An integrating apparatus according to claim 2, in which:

said main integrator comprises: means for generating countable pulses at a frequency proportional to the amplitude of said input signal and a resettable counter (Z) for receiving said countable pulses;

said programming means (P) applying said resetting pulses to an AND gating element (G) at the resetting input to said counter, the other input to said AND gating element being enabled only in the absence of said control signal supplied by said logic circuit when said comparators determine that no peak signal was present in the just previous measuring time interval;

whereby said counter continues to accumulate countable pulses without being reset whenever a peak is found by said slope detector, including those countable pulses during the first measuring interval in which part of a peak in the input signal is so found.

* * * * *